(12) United States Patent
Ungermann et al.

(10) Patent No.: US 7,418,650 B2
(45) Date of Patent: Aug. 26, 2008

(54) METHOD FOR TEMPORAL SYNCHRONIZATION OF CLOCKS

(75) Inventors: Jörn Ungermann, Aachen (DE); Peter Fuhrmann, Aachen (DE); Manfred Zinke, Aachen (DE)

(73) Assignee: NXP, B.V., Eindhoven (NL)

( * ) Notice: Subject to any disclaimer, the term of this patent is extended or adjusted under 35 U.S.C. 154(b) by 346 days.

(21) Appl. No.: 10/555,258

(22) PCT Filed: Apr. 26, 2004

(86) PCT No.: PCT/IB2004/050511

§ 371 (c)(1),
(2), (4) Date: Nov. 1, 2005

(87) PCT Pub. No.: WO2004/100411

PCT Pub. Date: Nov. 18, 2004

(65) Prior Publication Data

US 2007/0033294 A1    Feb. 8, 2007

(30) Foreign Application Priority Data

May 6, 2003  (EP) .................................. 03101255

(51) Int. Cl.
*G06F 11/00* (2006.01)

(52) U.S. Cl. .................. 714/798; 709/248; 714/789
(58) Field of Classification Search ............. 714/798, 714/789; 709/248
See application file for complete search history.

(56) References Cited

U.S. PATENT DOCUMENTS 6,157,957 A * 12/2000 Berthaud ................ 709/248

\* cited by examiner

*Primary Examiner*—Guy J Lamarre
(74) *Attorney, Agent, or Firm*—Aaron Waxler

(57) ABSTRACT

In order to carry out in a communication system (1) a temporal synchronization of clocks in a particularly rapid and efficient manner, a method is proposed which has the following steps: acquiring state values which are dependent on a time base (10); filing each acquired state value at a position in a first list L comprising (k+1) positions, if the acquired state value is smaller than or equal to the (k+1) smallest element of the list L, where k is a predefinable error tolerance; filing the acquired state value at a position in a second list H comprising (k+1) positions, if the acquired state value is greater than or equal to the (k+1) greatest element of the list H; forming a mean value from the (k+1) smallest element of the list L and the (k+1) greatest element of the list H, if the number of acquired state values is greater than or equal to (2k+2); determining a correction value as a function of the mean value; and correcting a current state value of the clocks that are to be synchronized.

15 Claims, 6 Drawing Sheets

METHOD FOR TEMPORAL SYNCHRONIZATION OF CLOCKS

The invention relates to a method for the temporal synchronization of clocks which are assigned to nodes that communicate via a communication medium.

The invention furthermore relates to a node which communicates with other nodes by means of a communication medium and to a communication system which has a number of nodes that communicate via a communication medium.

The invention also relates to a computer program which can be run on a computer, in particular on a microprocessor.

Nodes which communicate via a communication medium are for example control devices, sensors and actuators which exchange messages with one another by means of a bus system or network. A communication system consisting of such nodes and the associated communication medium may be used for example to control an airplane or a motor vehicle. In this case, the term "node" in particular also encompasses so-called interfaces which may be responsible both for a physical connection to the communication medium and for processing the transmitted and received messages.

A modern communication system is usually designed to be error-tolerant, so that at least certain basic functions are still carried out correctly even if errors occur within the communication system. This is particularly important, for example, if the communication system is being used in a safety-critical environment, such as for example to control an airplane or to control a motor vehicle. Such basic functions then ensure, for example, that an airplane still remains controllable even if errors occur within the communication system.

By way of example, an error-tolerant communication system is designed such that, when dealing with an error that has occurred within a node or during the transmission of messages, it is ensured that this error does not cause any consequential errors, such as for example other nodes in turn producing incorrect messages on account of an incorrectly sent, incorrectly transferred or incorrectly received message or being prevented from continuing to carry out their functions correctly. Without such a mechanism, it may occur for example that a node (so-called "babbling idiot") incorrectly transmits so large a number of messages via the communication medium that an active disruption of the transmitted data from other nodes may occur and/or the communication medium is overloaded and thus is no longer available or at least is no longer sufficiently available to the other nodes.

In communication systems used at present, a so-called time-controlled transmission method is increasingly being used in communication media, particularly in safety-critical environments, in order for example to reduce the occurrence of consequential errors. In this case, it is typically only possible for a node to transmit a message at certain times. This also ensures that the communication medium always has enough capacity to be able to transmit particularly important messages for example for safety-related applications.

Many communication systems require, for correct operation, a so-called global time. This is important, for example, in order to be able to define the simultaneousness of certain events, such as a simultaneous change of acquired values of various sensors. A global time is in particular also required for time-controlled message transmission, for example in order to ascertain when a node may transmit. Moreover, in the case of many time-controlled communication media it is possible to deduce the transmitter of a message on the basis of the time this message is received.

Various methods are known for the determination of the global time. By way of example, in a communication system there is a central clock, the current value of which is transmitted to the corresponding nodes by means of the communication medium. However, this method has the disadvantage that a malfunction of the global clock, resulting for example in the latter constantly outputting the same value as current value, usually results in a malfunction of the communication system. Moreover, an error upon transfer or receipt of an originally correctly transmitted global time may lead to two nodes interpreting the current time differently and hence trigger a malfunction or prevent correct communication.

Therefore, a number of clocks are usually used. By way of example, each node may have its own clock. However, on account of inaccuracies of the clocks and errors which may be caused by a faulty clock, the current times determined by these clocks normally differ more and more from one another over time. In order to determine a uniform global time, therefore, a synchronization of the clocks is carried out. In this case, use is made in particular of error-tolerant methods for synchronizing the clocks, in which it is ensured that current times which are incorrectly sent, transferred or received by a certain number of clocks cannot have a negative affect on the synchronization of a clock. In particular, such methods are also said to make it possible for a clock which is supplying an incorrect value or which has been newly started to be resynchronized with the other clocks.

In time-based methods for transmitting messages on a communication system, the individual messages are transmitted in time windows, known as frames. The frames are transmitted via the communication medium as a function of the global time such that a global time can be uniquely assigned to each frame. This makes it possible for each frame to be clearly identified by each node on the basis of the global time. In particular, each node can then recognize which frame is assigned to it for the transmission of a message. If the global time is determined as a function of its own clock, then the global times determined by various nodes between two synchronization cycles may differ. However, in order to be able to ensure a unique assignment of a frame to a global time, there must be a time interval between the individual frames, said time interval being dependent on the size of the possible maximum deviation of two clocks between two synchronization cycles. Since, however, no messages can be transmitted in this time interval, which is known as the inter frame gap, the length of the inter frame gaps affects the bandwidth (amount of data that can be transmitted per unit time) of the communication medium. This in turn means that the bandwidth is dependent on the accuracy of the clocks.

The mean accuracy of the clocks depends on how large a time interval is between two successive synchronizations, that is to say "how long" and thus also "how wide" the current times of the clocks differ from one another until a new synchronization takes place. The mean accuracy of the clocks also depends on how quickly a synchronization can be carried out, since the clocks may have already drifted apart from one another again between a transmitted clock time and the actual correction of a clock by means of a correction value determined during the synchronization method.

For the synchronization of clocks, methods exist which are based on the formation of a mean (so-called mean-based methods). In mean-based methods, as are used for example in the bus systems TTA and FlexRay, each node that is to be synchronized determines the mean of currently acquired times or state values which are transmitted to said node by various other clocks. In order for this method to achieve independence from a certain number of incorrect clock times which are transmitted to a node, a so-called error tolerance k is ensured. In this case, for example, one or more state values (for example the k greatest and the k smallest state values) that differ extremely from the state values of the other clocks are not taken into account during the determination of the mean.

In particular, the mean-based methods require, for an error-tolerant synchronization of clocks, a certain minimum number n of determined current state values, for example $n \geq (2k+2)$. If this is not achieved, either no synchronization can be carried out or time-consuming methods are required in order to ensure synchronization.

It is an object of the invention to provide a possibility which allows a temporal synchronization of clocks that is as tolerant of errors as possible to be carried out in a particularly rapid and efficient manner.

This object is achieved by a method of the type mentioned above which has the following steps:
  at least for the nodes that are to be synchronized: acquiring state values which are dependent on a time base of the nodes;
  for all acquired state values: filing the acquired state value at a corresponding position in a first list L comprising (k+1) positions, if the acquired state value is smaller than the (k+1) smallest element or is smaller than or equal to the (k+1) smallest element of the list L and where k is a predefinable error tolerance;
  for all acquired state values: filing the acquired state value Z at a corresponding position in a second list H comprising (k+1) positions, if the acquired state value is greater than the (k+1) greatest element or is greater than or equal to the (k+1) greatest element of the list H;
  forming a mean value from the (k+1) smallest element of the list L and the (k+1) greatest element of the list H if $n \geq (2k+2)$, where n is the number of acquired state values;
  determining a correction value as a function of the mean value; and
  correcting the clocks that are to be synchronized such that a current state value of this clock takes the correction value into account.

ADVANTAGES OF THE INVENTION

In the method according to the invention, the state values of the clocks of other nodes and also a state value of the clock of the node itself are filed in the first list L if they are smaller than or smaller than or equal to the greatest state value stored therein. Moreover, the state values are filed in the second list H if they are greater than the smallest or greater than or equal to the smallest state value already stored in the list H. In this case, both the list L and the list H comprise precisely (k+1) positions, so that in each case (k+1) state values can be stored in the list L and in the list H.

This method makes it possible, after the method has been carried out, for the (k+1) smallest state values to be filed in the list L as a function of their size and for the (k+1) greatest values of the acquired state values to be filed in the list H. In this case, the individual positions of the lists L and H may be numbered for example such that the (k+1) smallest state value is located in the list L at the position L0 and the smallest acquired state value is stored at the position Lk. Correspondingly, the (k+1) greatest state value can be stored in the list H at the position H0 and the greatest acquired state value can be stored at the position Hk.

In order to determine the mean value from the (k+1) smallest and the (k+1) greatest state values, for example, the arithmetic mean is formed from the state values stored at positions L0 and H0 of the lists L and 14. As a function of this mean value, a correction value is then determined such that the clock assigned to the node can be synchronized. For this purpose, the correction value may be for example an absolute value which is assigned to the clock. It is also conceivable that the correction value is a relative value which must be added to the current value of the clock assigned to the node in order to obtain a current value that is synchronized with the other clocks.

One particular advantage of the method according to the invention is that a position in the list is not provided for every state value. Rather, it is sufficient if there are only (k+1) positions in each list, that is to say therefore that overall only (2k+2) state values have to be filed and stored. All state values which are greater than the (k+1) smallest state value and smaller than the (k+1) greatest state value may consequently be rejected. A memory space-saving acquisition and administration of the state values needed to calculate the mean value can thereby be achieved.

By means of the method according to the invention, the number of memory access operations can consequently also be reduced. Thus a particularly efficient and rapid method of synchronizing clocks can in particular be achieved if the number of acquired state values is considerably greater than (2k+2).

In modern bus systems, such as FlexRay for example, the error tolerance may be for example k=2. In this case, in the method according to the invention, the list L and the list H must in each case comprise only three positions, namely L={L0, L1, L2} and H={H0, H1, H2}. A maximum of six state values are thus stored in a sorted manner, even if the number of state values which are acquired overall by a node that is to be synchronized and which are to be taken into account in the determination of the correction value is considerably more than six, as is often the case for example in implementations of the FlexRay bus system to control a motor vehicle.

In one advantageous development of the method, the filing of the determined state values in the first list L and/or in the second list H takes place sequentially. Since the state values are usually acquired sequentially by a node, this development makes it possible to further process an acquired state value directly such that a check is made as to whether this acquired state value should be filed in one of the lists L and/or H or whether it should be rejected. Consequently, there is no need for any intermediate storage of a number of state values, as a result of which there is again a saving in terms of memory space. By virtue of the associated reduced number of memory access operations, the method can be made even more rapid.

A further advantage of this development is that the time interval between the acquisition of the first state value and the end of synchronization can be reduced since each state value is processed sequentially even if a subsequent state value is acquired. As a result, following acquisition of the last state value the method is reduced to filing the last state value in the list L and/or the list H, forming the mean value from the state values stored at positions L0 and H0, determining the correction value and correcting the clock. In particular, in this development, when the last state value is detected a large number of the acquired state values have usually already been rejected.

In one preferred embodiment, the list L is formed by corresponding registers L0, L1, . . . , Lk and/or the list H is formed by corresponding registers H0, H1, . . . , Hk. A particularly rapid synchronization of the clocks can thus be achieved since a register can typically be formed in hardware and thus allows a particularly rapid write and read access.

Advantageously, the first list L is initialized with values which are greater than the greatest state value that is to be expected and the second list H is initialized with values which are smaller than the smallest state value that is to be expected. Such an initialization of the lists L and H means that for all state values a filing in the list L and/or in the list H is dependent on the same conditions. These conditions are supported by the conditions already mentioned above:

filing of a state value in the first list L if the state value is smaller than or smaller than or equal to the greatest value in the list L.

filing of a state value in the second list H if the state value is greater than or greater than or equal to the smallest value in the list L.

With this embodiment, these conditions can be formulated independently of whether state values have already been filed in the lists L and H.

Preferably, during filing of an acquired state value in the first list L a sorting in terms of the size of the stored state values is retained so that value(L0)$\geq$value(L1)$\geq \ldots \geq$value (Lk) is always true, where L0, L1, . . . , Lk denote the (k+1) positions of the list L and value(Li) is the value at the position Li. Furthermore, during filing of an acquired state value in the second list H a sorting in terms of the size of the stored state values is retained so that value (H0)$\leq$value(H1)$\leq \ldots \leq$value (Hk) is always true, where H0, H1, . . . , Hk (denote the (k+1) positions of the list H and value(Hi) is the value at the position H1.

This achieves, in a particularly simple manner, the situation where a sorting of the lists L and H is always ensured and a time-consuming sorting does not have to be carried out for example once the last state value that has to be taken into account has been acquired by the node. Particularly in conjunction with the above-described sequential processing of the acquired state values, this also ensures that the (k+1) smallest of the acquired state values is always stored at the position L0 and the (k+1) greatest of the acquired state values is always stored at the position H0.

Further advantages can be seen from the embodiments described herein. It is described therein how a filing of a state value Z in the first list L and/or in the second list H can be carried out in a particularly clear and simple manner. For this purpose, firstly a position that corresponds to the size of the state value Z is determined within the lists L and H by means of comparison with the elements in the lists, for example starting with the greatest or smallest element filed thus far. The state value Z is then filed in that all greater elements of the list L are moved "downward" one position, the greatest value of the list L, which is located at position L0, dropping out of the list L as a result of the fact that the value at position L0 is replaced by the value at position L1. The same applies to the case of filing a state value Z in the list H.

In one preferred embodiment, the following steps are carried out:

as a function of the error tolerance k, a set B of predefinable end values B={B0, B1, . . . , Bk} is predefined such that B0=0; Bi$\leq$B(i+1), for all i$\in${0, 1, . . . , (k−1) }; and 2j<B(j), for all j$\in${1, . . . , k};

if Bk>n, a value i for i$\in${0, 1, . . . , (k−1)} is selected as a function of the number n of acquired state values such that the condition Bi$\leq$n<B(i+1) is true;

if Bk$\leq$n, i=k is selected; and the mean value is formed from the values stored at the positions L(k−i) and H(k−i).

This embodiment is suitable for ensuring synchronization of the clocks even if the number n of state values acquired in the node is not reached such that this number n is less than (2k+2). In particular, in this case an actual error tolerance 1 is achieved which is not predefined but rather is determined as a function of the number n of acquired state values, as a function of the predefinable error tolerance k and as a function of the predefinable end values B0, B1, . . . , Bk, where 1$\leq$k is always true. This embodiment thus has the advantage, even when there are less than the originally expected number of acquired state values in a node, of ensuring synchronization of the clock in this node. In particular, in this embodiment, if n<(2k+2) an error-tolerant synchronization with an error tolerance 1$\leq$k is possible.

Advantageously, the following values are predefined:
error tolerance k=2;
end value B1=3; and
end value B2=8.

Using these values, an error-tolerant synchronization of clocks in a communication system, for example FlexRay, can be ensured in a particularly efficient and rapid manner for any number n of acquired state values.

The object is also achieved by a node which
has a clock;
has means for acquiring state values, the state values being dependent on a time base of the node and/or on a time base of the other nodes;
has a first list (L) comprising (k+1) positions and a second list (H) comprising (k+1) positions;
has means for filing an acquired state value at a corresponding position of the first list (L);
has means for filing an acquired state value at a corresponding position of the second list (H);
has means for forming a mean value from an element of the first list (L) and an element of the second list (H);
has means for forming a correction value; and
has means for correcting the clock.

Preferably, a method as described herein is carried out in the node.

The object is furthermore achieved by a communication system of the type mentioned above, in which at least one node
has a clock (15);
has means for acquiring state values;
has a first list (L) comprising (k+1) positions and a second list (H) comprising (k+1) positions;
has means for filing (120) an acquired state value at a corresponding position of the first list (L);
has means for filing (130) an acquired state value at a corresponding position of the second list (H);
has means for forming (160) a mean value (M) from an element of the first list (L) and an element of the second list (H);
has means for forming a correction value (K); and
has means for correcting the clock (15).

Preferably, a method as described herein is carried out in at least one node in the communication system.

The implementation of this invention in the form of a computer program is particularly important. In this case, the computer program can be run on a computer, in particular on a microprocessor, and is suitable for carrying out the method according to the invention. In this case, therefore, the invention is implemented by the computer program such that this computer program represents the invention in the same manner as the method which the computer program can carry out. The computer program is preferably stored in a memory element. The memory element used may in particular be a Random Access Memory, a Read Only Memory or a Flash memory.

Also important is the implementation of this invention in hardware, so that the hardware is suitable for carrying out the method according to the invention. An implementation in hardware has the advantage of the method according to the invention being carried out even more rapidly.

The invention will be further described with reference to examples of embodiments shown in the drawings to which, however, the invention is not restricted.

FIG. 2b shows a schematic diagram of another arrangement of the components of a node shown in FIG. 2a.

Figure 1:
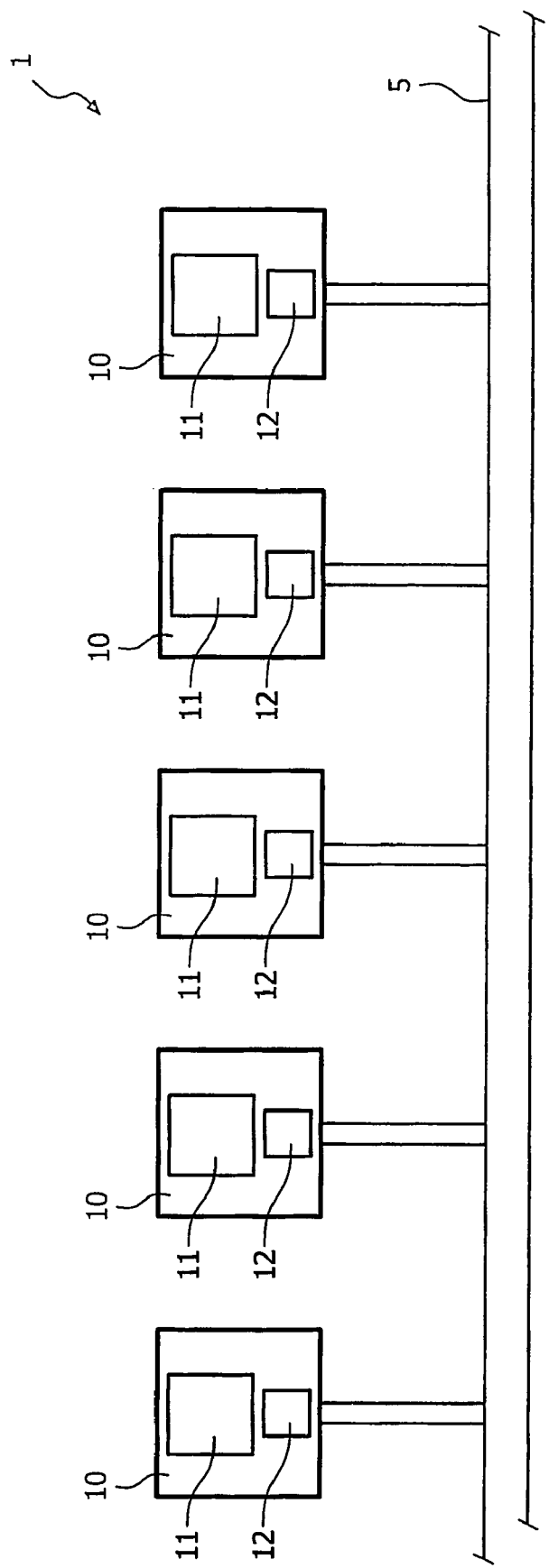
FIG. 1 shows a communication system consisting of a number of nodes which communicate via a communication medium.

FIG. 1 shows a communication system 1 which consists of a number of nodes 10, said nodes being connected to one another via a communication medium 5. The communication medium 5 is designed as a time-controlled bus system (TTA—Time Triggered Architecture), for example in accordance with the FlexRay specification or in accordance with the TTP (Time Triggered Protocol). It is also conceivable that the communication medium 5 is formed in accordance with another network topology, for example as a ring.

Each node 10 shown in FIG. 1 has a so-called host 11 and an interface 12. The host 11 may be configured for example as a microcomputer formed on a single microchip. It is likewise conceivable that the host 11 is an entire computer system which in turn consists of a number of computers that communicate with one another via a network.

The interface 12 is located between the host 11 and the communication medium 5. It controls, for example, the transmission of information from the host 11 or to the host 11 by converting the information into a message format which corresponds to the data frames predefined by the communication medium 5. A frame is typically a set of bits which are interpreted according to predefined rules, the rules being defined by the message format. The message format of FlexRay, for example, designates a special SYNC bit which indicates whether the message concerned is to be used for synchronization, and an LEN bit which indicates the number of data bytes which contain the actual message (useful data).

Of course, it is also possible that the host 11 and the interface 12 are designed merely as different functional units on the same microchip.

In a time-controlled communication medium 5, the bandwidth of communication can be fixedly predefined in the form of one (or more) global temporal sequences (known as global schedules). Such a schedule comprises information about when a node 10 can transmit a message by means of the communication medium 5 and when it can expect a message. If the messages are transmitted for example in frames, a schedule in particular provides information about which frame is available to a node 10 for transmitting a message.

Since the entire communication on the communication medium 5 is time-controlled by means of the global schedule, a message need not contain any receiver or transmitter address. Each node 10 identifies the transmitter and receiver of a message on the basis of when this message was transmitted. There is thus no need for an address field in the frames, thereby increasing the bandwidth.

Figure 2A:
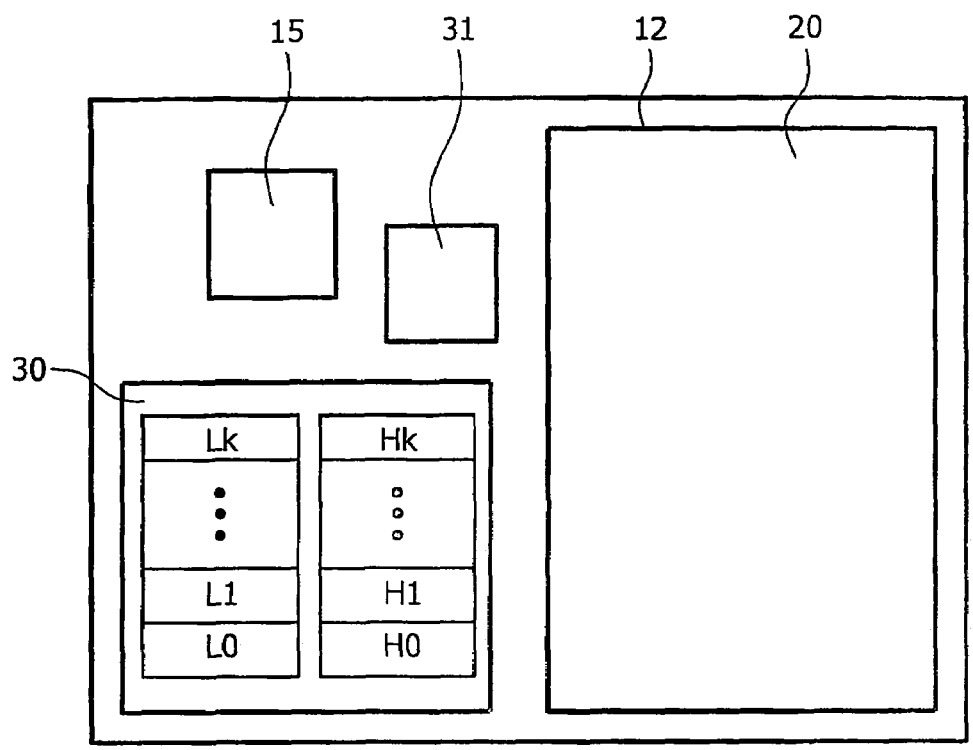
FIG. 2a shows a schematic diagram of selected components of a node.

FIG. 2a shows an interface 12 which has a clock 15, a microprocessor 20 and a memory element 30. The memory element 30 is designed for example as a random access memory (RAM) and has addressable memory areas L0, L1, . . . , Lk and H0, H1, . . . , Hk. The interface 12 also has another memory element 31 which is configured for example as a read only memory (ROM). In the memory element 31 there may be stored for example a computer program which is programmed to carry out the method according to the invention. Of course, it is also conceivable that the memory elements 30 and 31 are formed as a single memory element.

Figure 2B:
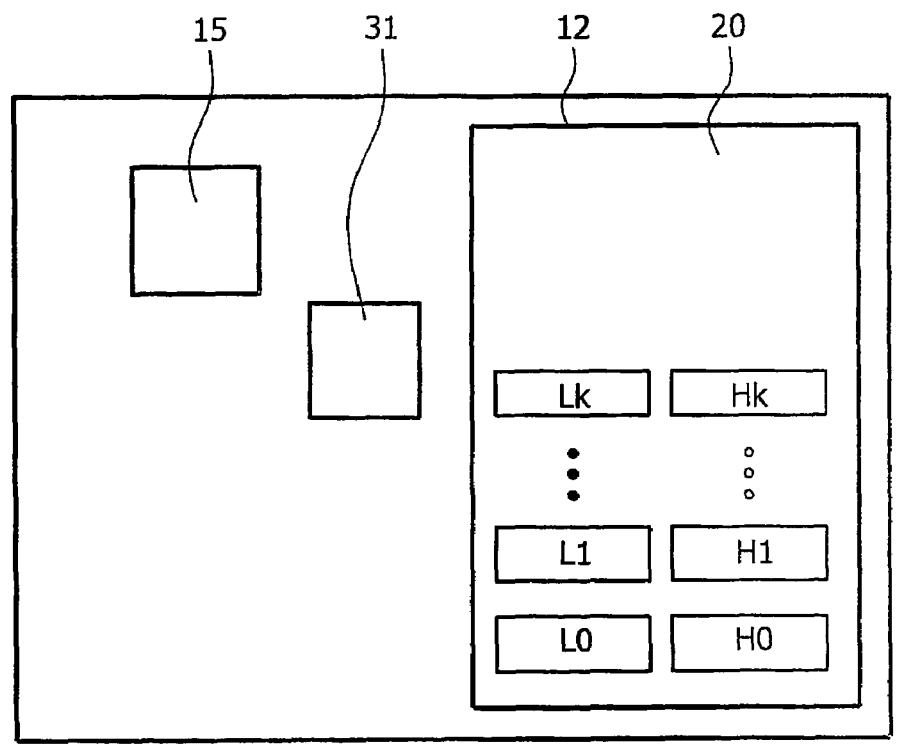

An interface 12 shown in FIG. 2b likewise has a clock 15, a microprocessor 20 and a memory element 31. However, in this case the microprocessor has registers L0, L1, Lk and H0, H1, . . . Hk. The embodiment of an interface 12 shown here has the advantage, compared to the embodiment shown in FIG. 2a, that the time taken to access a register L0, L1, . . . , Lk and H0, H1, . . . , Hk is shorter than in the case of other memory elements. As a result, when using registers L0, L1, . . . , Lk and H0, H1, . . . , Hk instead of the corresponding memory areas shown in FIG. 2a, data can be written to the positions L0, L1, . . . , Lk, H0, H1, Hk and read from these positions more rapidly.

Figure 3:
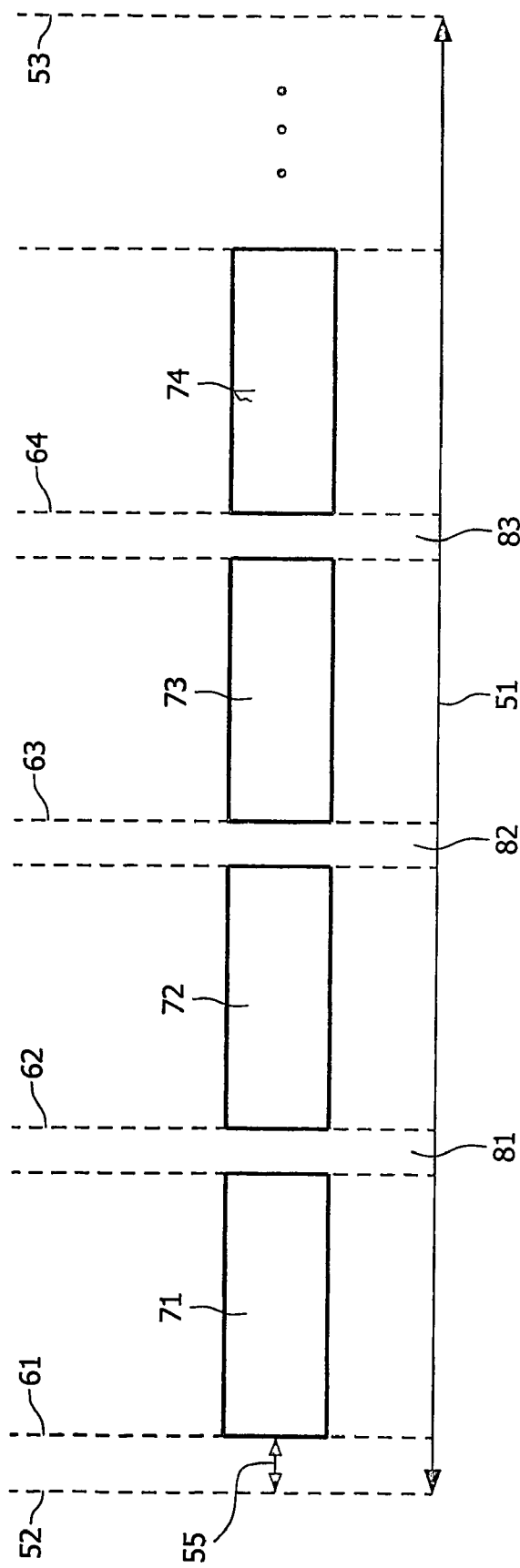
FIG. 3 shows a schematic diagram of a communication cycle having a number of frames.

FIG. 3 shows a communication cycle 51, the start of which is shown by a dashed line 52 and the end of which is shown by a dashed line 53. At the start of a communication cycle 51, for example, a so-called SYNC symbol 55 is transmitted which makes it possible for all nodes 10 involved in the communication to recognize the start of a communication cycle 51. However, it is also possible for a communication cycle to start without the SYNC symbol 55. Within the communication cycle 51, typically a number of frames 71, 72, 73, 74, . . . are transmitted, of which four frames are shown here by way of example. In a time-controlled transmission method, the frames 71, 72, 73, 74 are transmitted within definable so-called time slots, the starts of which time slots are referenced 61, 62, 63, 64 here. Between the frames 71, 72, 73, 74 there are time intervals, the so-called inter frame gaps 81, 82, 83 in which no messages are transmitted. The inter frame gaps 81, 82, 83 are necessary in order to allow, even in the case of slightly differing clocks 15 of the nodes 10 within a communication system 1, a unique identification of a frame 71, 72, 73, 74 to one of these frame-transmitting nodes.

In order that all nodes 10 communicating via the communication medium 5 assess the frames 71, 72, 73, 74 in an identical manner with respect to their assignment to a node 10, it is particularly important that the clocks or these nodes 10 are synchronized. In this case, the clock 15 may be located in the host 11 or in the interface 12. The process of synchronization of the clock 15 may likewise take place in principle in the host 11 or the interface 12.

However, the bandwidth of the communication depends on the accuracy of synchronization of the clocks 15 in the communication system 1 since—in order to ensure a unique identification of the frames 71, 72, 73, 74 by all nodes 10—the frames 71, 72, 73, 74 do not follow one another directly but rather there is an inter frame gap 81, 82, 83, between the frames 71, 72, 73, 74. This inter frame gap 81, 82, 83, denotes a time interval which passes between the end of a first frame 71, 72, 73, and the start of a second frame 72, 73, 74 that follows. Given sufficiently accurately synchronized clocks, the situation can thus be prevented whereby two nodes 10 interpret the same frame 71, 72, 73, 74 differently on account of their current time with respect to the schedule, for example such that a node 10 whose clock 15 is slow compared to the global clock incorrectly interprets the second frame 72, 73, 74 as the first frame 71, 72, 73.

The more accurately the clocks 15 of the nodes 10 are synchronized with one another, the smaller the inter frame gap 81, 82, 83 between the individual frames 71, 72, 73, 74 can be. The smaller the inter frame gap 81, 82, 83, between the individual frames 71, 72, 73, 74, the greater the bandwidth of the communication.

Typically, the synchronization is carried out by means of specialized hardware which is integrated in the interface 12 in order to be able to achieve a rapid and exact synchronization of the clocks 15 which are likewise integrated in the interfaces 12.

Figure 4:
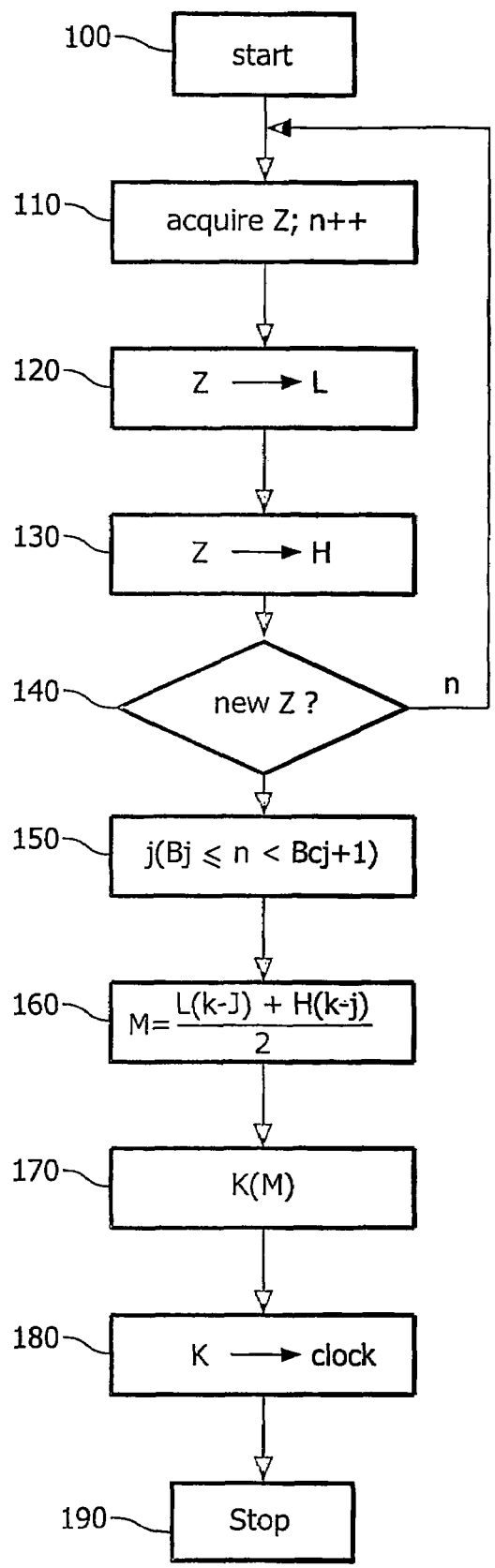
FIG. 4 shows a flowchart of a method according to the invention.

FIG. 4 shows a highly simplified flowchart of a method according to the invention. The method starts at a step 100 for example when in a node 10 a synchronization of the clock 15 assigned to this node 10 is to be carried out. At the start of the method, an initialization of certain variables is carried out. By way of example, the number n of acquired state values is set to zero (n=0).

In a step 110, a state value Z is acquired for example in that a frame 71, 72, 73, 74 transmitted by means of the communication medium 5 is interpreted by the node 10 as a synchronization message and the state value Z is read from the corresponding bits of the frame 71, 72, 73, 74, said bits being defined in the message format. Following acquisition of the state value Z, the number n of acquired state values is increased by 1 (n++).

In a step 120, the acquired state value Z is filed in a first list L, formed for example by the registers L0 to Lk, if the state value Z is smaller than the greatest value stored in the list L. In order to ensure that the first k acquired state values are in any case stored in the list L without a check being carried out as to how many state values have already been stored in the list L, in the initialization phase of step 100 the registers L0 to Lk are initialized with a value $+\infty$, which is greater than any state value Z that is to be expected, so that $Z \leq +\infty$ is always true, for all Zs.

Hereinbelow, an exemplary method using pseudo-code notation will be shown in respect of the filing of a state value Z in the list L. In this case, the values stored in the registers L0, . . . , Lk are denoted L[0], . . . , L[k]:

```
(l1)    for (i = k; i ≧ 0; i--) {
(l2)        if (Z < L[i]) {
(l3)            for (j = 0; j < i; j++) {
(l4)                L[j] = L[j+1];
(l5)            }
(l6)            L[i] = Z;
(l7)            break i;
(l8)        }
(l9)    }
```

In row (l1), a counter i is initialized and a first loop is defined. Each time the loop is passed through, the value i, starting with i=k, is reduced by the value 1 (i--). Depending on the value of i, the instructions of rows (l2) to (l7) are then carried out. By means of the first loop in conjunction with the inquiry in row (l2), the entire list L is searched for a position or a register Li for which the state value Z is smaller than the value stored at the position or register Li. If no such position is found, the value Z is not filed in the list L but rather is rejected. If, however, such a position Li is recognized in row (l2), then in row (l3) a second loop is initialized and started which is delimited by rows (l3) to (l5). In this second loop, each value at a position Lj in the list is replaced by the value L(j+1), which is stored at the next highest position, if j<i. All values at positions "below" the position Li found in row (l2) are therefore moved "downward" by one position, with the value at position L0 dropping out. In row (l6), the state value Z is then stored at the position or in the register Li and the filing operation is terminated (break i).

In a step 130 of the method according to the invention shown in FIG. 4, analogously to step 120, the acquired state value Z is filed in the list H, formed for example of the registers H0 to Hk, if the state value Z is greater than the smallest value stored in the list H. In order to ensure that the first k acquired state values are in any case stored in the list H without a check being carried out as to how many state values have already been stored in the list H, in the initialization phase of step 100 the registers H0 to Hk are initialized with a value $-\infty$, which is smaller than any state value Z that is to be expected, so that $Z > -\infty$ is always true, for all Zs.

The filing of the state value Z in the list H is likewise shown by way of example in pseudo-code. In this case, the values stored in the registers H0, . . . , Hk are denoted H[0], . . . , H[k]:

```
(h1)    for (i = k; i ≧ 0; i--) {
(h2)        if (Z > H[i]) {
(h3)            for (j = 0; j < i; j++) {
(h4)                H[j] = H[j+1];
(h5)            }
(h6)            H[i] = Z;
(h7)            break i;
(h8)        }
(h9)    }
```

In row (h1), again a counter i is initialized and a first loop is defined. Depending on the value of i, the instructions of rows (h2) to (h7) are then carried out. By means of the first loop in conjunction with the inquiry in row (h2), the entire list H is searched for a position or a register Hi for which the state value Z is greater than the value stored at the position or register Hi. If no such position Hi is found, the value Z is not filed in the list H but rather is rejected. If, however, such a position H1 is recognized in row (h2), then in row (h3) a second loop is initialized and started which is delimited by rows (h3) to (h5). In this second loop, each value at a position Hj in the list is replaced by the value H(j+1), which is stored at the next highest position, if j<i. All values at positions "below" the position H1 found in row (h2) are therefore moved "downward" by one position, with the value at position H0 dropping out. In row (h6), the state value Z is then stored at the position or in the register Hi and the filing operation is terminated (break i).

In a step 140, a check is made as to whether a new state value Z is to be acquired, for example because a further SYNC frame has been recognized. If a new state value Z is to be acquired, the method is continued at step 110. If this is not the case, in a step 150 a value j is determined as a function of the number n of acquired state values Z and as a function of end values Bi. The value j is determined in order to allow error-tolerant synchronization by means of the further steps of the method according to the invention even in the case where the number n of acquired state values is smaller than (2k+2).

The value j is determined such that $$Bj \leq n < B(j+1), \text{ for } j \in \{0, 1, \ldots, (k-1)\}$$

is always true.

The end values Bi (or Bj) are expediently initialized in the initialization phase of step 100. In this case, the end values Bi are initialized such that they satisfy the following conditions:

B0=0;
Bi≦B(i+1), for all i∈{0, ..., k−1};
2j<Bj, for all j∈{0, ..., k}.

For a predefined error tolerance k=2, the end values Bi for i∈{0, 1, 2} could for example be determined as follows:
B0=0;
B1=3;
B2=8.

If the end values Bj are as selected above and if for example only five state values Z are acquired, consequently the number n=5, and thus j=1 for the value j. As a function of the value j, in a step 160 a mean value M that can be used for synchronization is determined from in each case one value from the list L and one value from the list H, for example in accordance with the equation $$M = \frac{L(k-j) + H(k-j)}{2}$$

(so-called arithmetic mean).

In the case where the number n of acquired state values n≧(2k+2), the value j is j=k. In this case, therefore, the mean value M is formed from the values stored at positions L0 and H0. As described above, in steps 120 and 130 the state values Z are filed in the lists L and H such that the smallest of the acquired state values is located at position Lk and the greatest of the acquired state values is located at position Hk. Furthermore, for n≧(2k+2), the (k+1) smallest value is stored at the position L0 and the (k+1) greatest value is stored at the position H0. Thus, if n>(2k+2), the mean value M is formed from the (k+1) smallest and the (k+1) greatest value of the acquired state values. This means in particular that the k greatest and k smallest acquired state values are not taken into account when determining the mean value, and this is in accordance with the error tolerance k.

If the end values Bi for k=2 are again determined as shown above and if the number n of acquired state values Z is again n=5, then the value j is again j=1 and hence in this case the mean value is formed from the values stored at positions L(k−1)=L(1) and H(k−1)=H(1). From this example it can be seen that an error-tolerant synchronization of the clocks is possible with the method according to the invention even if n<(2k+2). In this example, this variable error tolerance 1 is for example 1=1.

In a step 170 a correction value K is determined as a function of the mean value M, in a step 180 the clock 15 assigned to the node 10 is synchronized as a function of the correction value K and in a step 190 the method then ends. The correction value K may for example be a relative value which takes into account the current state value of the clock 15 assigned to the node 10 so that the correction value K need only be added to the current state value for a synchronization of the clock 15.

Of course, it is conceivable that further steps may be added to the method shown in FIG. 4 or that steps may be omitted. In particular, it is conceivable that individual steps may be combined and/or the carrying out of a number of steps or the working of an individual step takes place in a different order. Of course, it is also possible that an implementation of the method according to the invention may deviate from the examples, in particular the examples of embodiments shown in pseudo-code.

An example of embodiment of a method according to the invention as shown in FIG. 4 may be implemented for example in the form of a computer program. However, in order in particular to achieve a more rapid implementation of the method according to the invention, the method may also be implemented in hardware, for example by means of a so-called ASIC (Application-Specific Integrated Circuit). It is also conceivable that already existing hardware, for example a certain functional unit within the interface 10, may be expanded such the method according to the invention can be carried out.

Furthermore, all references and indices, for example the numbering of the positions of the lists L and H, are not fixed but rather are to be regarded as logical designations. It is thus conceivable that the lists L and H and also the positions of these lists may be denoted differently. A change in the numbering, in particular a reversing of the sorting order, is also conceivable. If the sorting order were to be reversed, for example, the (k+1) smallest value would be stored at the position L(k) and the (k+1) greatest value would be stored at the position H(k+1). The steps of the method according to the invention would have to be adapted accordingly, in particular steps 120, 130 and 160.

Figure 5:
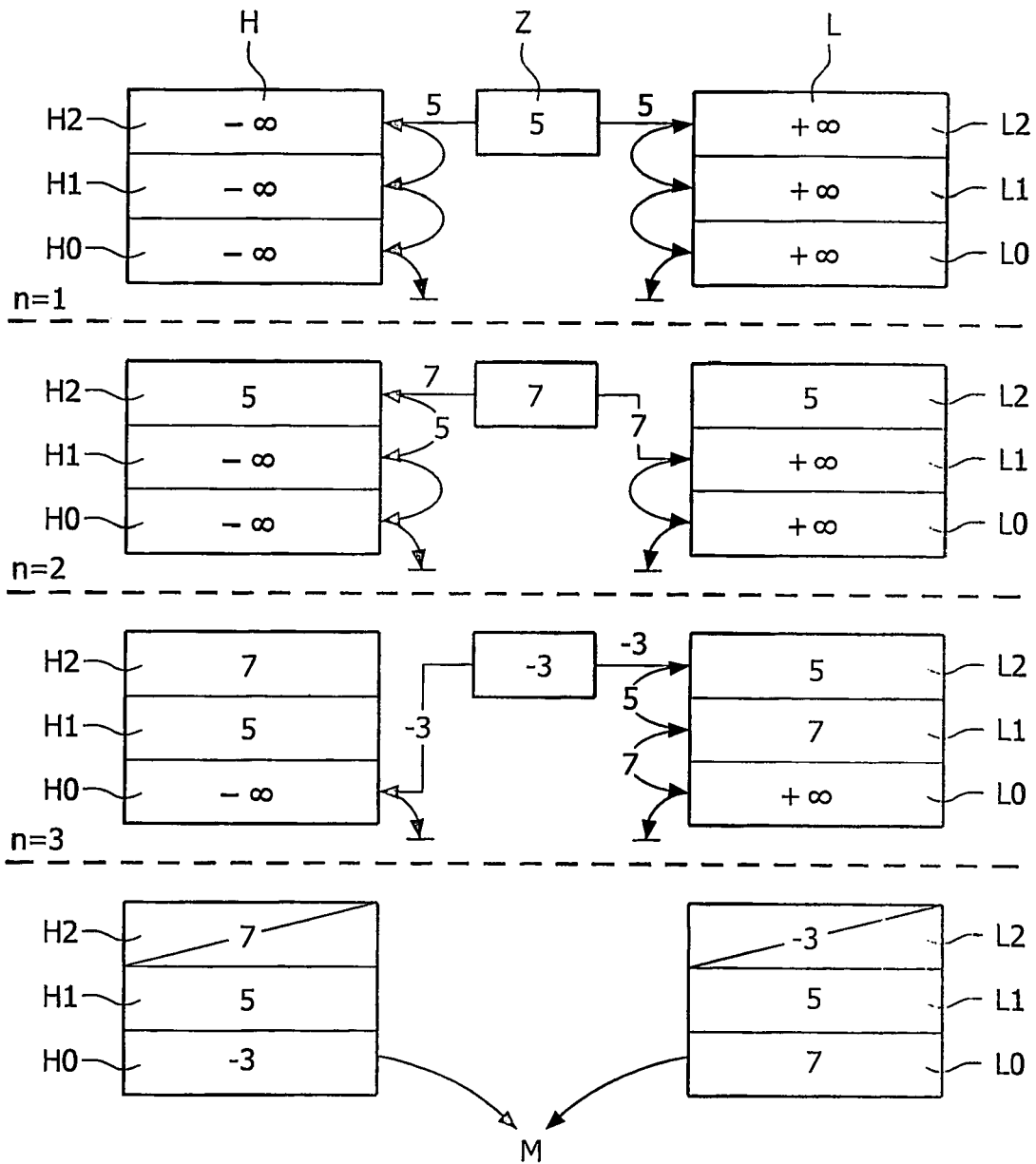
FIG. 5 shows a schematic diagram of state values Z stored in lists L and H during carrying out of the method according to the invention, where n<(2k+2).

FIG. 5 shows an example of a procedure for filing acquired state values Z in the lists L and H. In this case, the filing takes place analogously to the description of steps 120 and 130 of the method according to the invention shown in FIG. 4. Lists H and L are shown, these lists having the positions H0, H1, H2 and L0, L1, L2. Z denotes an acquired state value which is to be filed in the lists L and H. Before filing a first (n=1) acquired state value Z=5, the positions L0, L1, L2 are initialized with the value +∞ and the positions H0, H1, H2 are initialized with the value −∞. In this case, the values −∞ and +∞ are selected such that −∞ is smaller than any state value Z that is to be acquired and +∞ is greater than any state value Z that is to be acquired, that is to say −∞<Z<+∞ is always true, for all Zs.

Firstly, analogously to the example of embodiment described above in pseudo-code and shown in FIG. 4, positions Li and Hi are sought at which the acquired value Z is to be stored. Such a position Li or Hi is recognized if L[i]>Z or H[i]<Z, respectively, with the lists being searched from top to bottom, that is to say in the order L2→L1→L0 and H2→H1→H0, in this example of embodiment. For the first state value Z=5, the positions L2 and H2 are determined. The values at the positions L0 and H0 are then replaced by the values at positions L1 and H1 and then the values at positions L1 and H1 are replaced by the values at positions L2 and H2. The values in the lists L and H are therefore in each case moved "downward" by one position, with the "lowermost" value at position L0 and H0 dropping out. The state value Z=5 is then stored at positions L2 and H2.

A second (n=2) state value Z=7 is then acquired and stored at positions H2 and L1 in accordance with the above method. The values from these positions are again moved downward by one position until the values at positions L0 and H0 again drop out.

A third (n=3) state value Z=−3 is then acquired and stored at positions H0 and L2 in accordance with the above method. The values from these positions are again moved downward by one position. The values at positions L0 and H0 again drop out.

In the example of embodiment shown in FIG. 5, it is assumed that no further state values Z are detected. The value j is then determined analogously to steps 150 and 160 of FIG. 4 and the values given there by way of example for the end values Bi. Consequently, the values at positions L(2−1)=L1 and H(2−1)=H1 are used to form the mean value M, which thus gives M=5.

Figure 6:
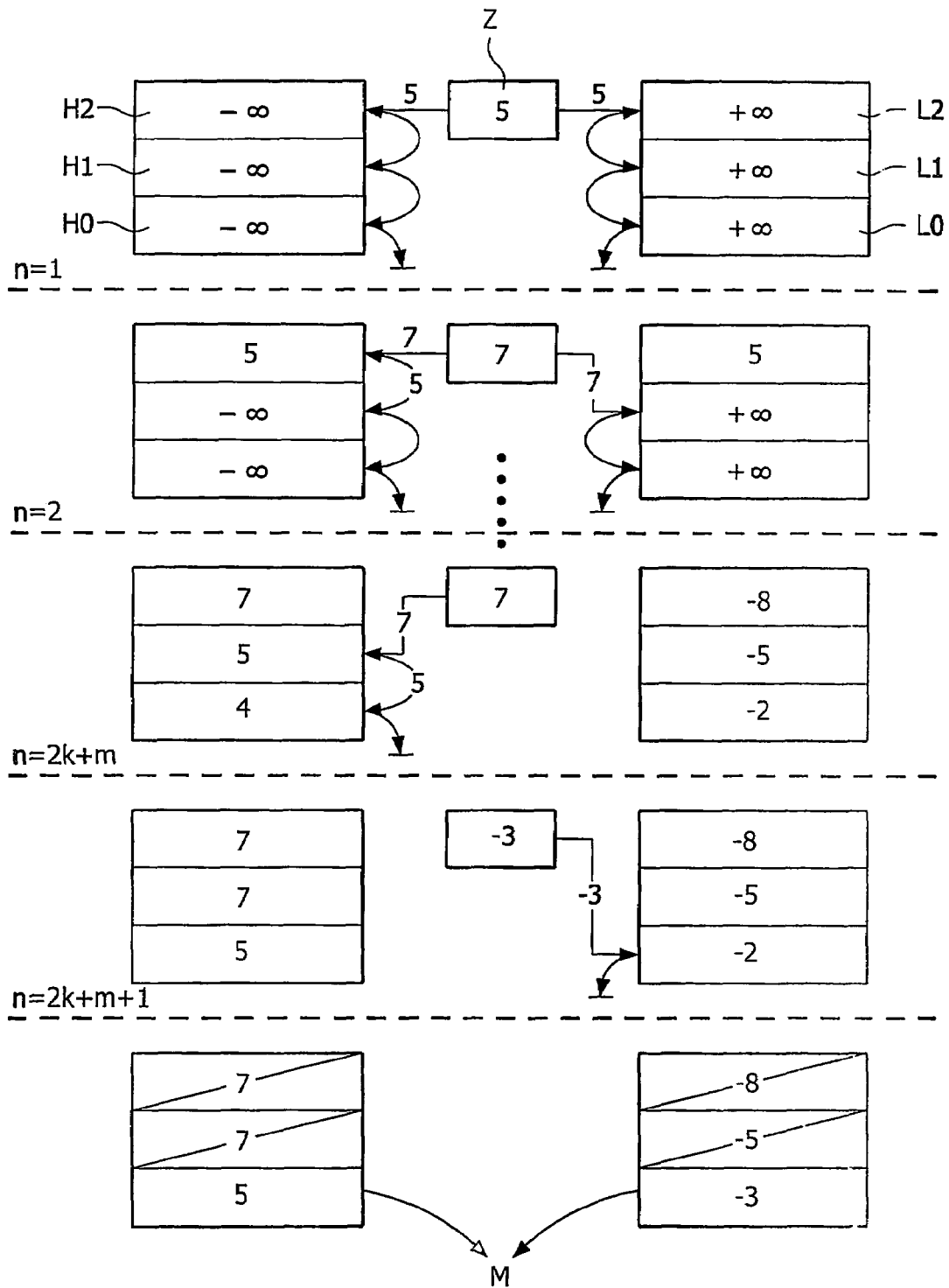
FIG. 6 shows a schematic diagram similar to FIG. 5, but with n≧(2k+2).

FIG. 6 shows a further example of a procedure for filing acquired state values Z in the lists L and H. In this case, the filing again takes place analogously to the description of steps 120 and 130 of the method according to the invention shown in FIG. 4.

In this example, however, more than (2k+2) state values Z are acquired and filed in the lists L and H. Firstly, as already described in FIG. 5, the first two state values Z=5 and Z=7 are filed in the lists L and H. Further (2k+m−1) state values Z for an m>2 are then filed, although this is shown in FIG. 6 only by the dotted transition from (n=2) to (n=2k+m).

The (2k+m)th acquired state value Z=7 is then dealt with analogously to steps 120 and 130 of FIG. 4 and where appropriate filed in the lists H and L. In this case, all values stored in the list L are smaller than Z=7. The state value Z=7 is therefore not stored in the list L. However, a check of the values stored in the list H reveals that the value Z=7 is to be stored at the position H1 after the value at the position H0 has been replaced by the value at the position H1. The value at the position H0 thus again drops out of the list.

Analogously, a further, last state value Z=−3 is acquired and stored at the position L0. Since now more than (2k+2) state values have been acquired, the values stored at positions L0 and H0 are used to form the mean value M. Consequently, an error-tolerant synchronization of the clock 15 with the error tolerance k=2 is possible.

In the examples shown in FIGS. 4 and 5 and also in the example of embodiment shown in FIG. 4, it is conceivable that the filing operation may be changed such that for an acquired state value Z a check is firstly made as to whether it is smaller or greater than the value stored at position L0 and H0, and the process of finding a suitable position for storing it is started only if this is the case. In this way it is possible to reduce the time taken to carry out the method according to the invention, particularly if the number of acquired state values n is often considerably greater than (2k+2).

The invention claimed is:

1. A method for the temporal synchronization of clocks which are assigned to nodes that communicate via a communication medium (5), characterized by the following steps:

at least for the nodes that are to be synchronized: acquiring state values which are dependent on a time base of the nodes;

for all acquired state values: filing the acquired state value at a corresponding position in a first list, L, comprising (k+1) positions, if the acquired state value is smaller than the (k+1) smallest element or is smaller than or equal to the (k+1) smallest element of the list, L, and where k is a predefinable error tolerance;

for all acquired state values: filing the acquired state value at a corresponding position in a second list, H, comprising (k+1) positions, if the acquired state value is greater than the (k+1) greatest element or is greater than or equal to the (k+1) greatest element of the list, H;

computing a mean value, M, from the (k+1) smallest element of the first list, L, and the (k+1) greatest element of the second list, H, if n≧(2k+2), where n is the number of acquired state values;

determining a correction value, K, as a function of the mean value, M; and correcting the clocks that are to be synchronized such that a current state value of this clock takes the correction value into account.

2. A method as claimed in claim 1, characterized in that the filing of the determined state values in the first list, L, and/or in the second list, H, is carried out sequentially.

3. A method as claimed in claim 1, characterized in that the first list, L, is formed by corresponding registers L0, L1, . . . , Lk, and/or the second list, H, is formed by corresponding registers , H0, H1, . . . , Hk.

4. A method as claimed in claim 1, characterized in that the first list, L, is initialized with values which are greater than the greatest state value that is to be expected; and/or the second list, H, is initialized with values which are smaller than the smallest state value that is to be expected.

5. A method as claimed in claim 1, characterized in that during filing of an acquired state value in the first list, L, a sorting in terms of the size of the stored state values is retained so that value(L0)≧value(L1)≧. . . ≧value(Lk) is always true, where L0, L1, . . . , Lk denote the (k+1) positions of the list, L, and value(Li) is the value at a position (Li); and during filing of an acquired state value in the second list, H, a sorting in terms of the size of the stored state values is retained so that value (H0)≦value(H1)≦. . . ≦value(Hk) is always true, where H0, H1, . . . , Hk denote the (k+1) positions of the list, H, and value (Hi) is the value at a position (Hi).

6. A method as claimed in claim 1, characterized in that a state value (Z) is stored at a position (Li) of the first list, L, as a function of the following steps:

the positions , L0, L1, . . . ,Lk, are searched for a position (Li) of the first list, L, so that the following is true:

value(L0)≧value(L1) ≧. . . ≧value(Li)≧Z ≧value(L(i+1)) ≧. . . ≧value(Lk); if no such position (Li) is found, then the state value (Z) is rejected;

if such a position (Li) is found, then for all positions {(Lj↑0≦j<i}the value (Lj) stored at the position (Lj) is replaced by the value(L(j+1)) stored at the position L(j+1) and the state value (Z) is stored at the position (Li) of the list, L.

7. A method as claimed in claim 1, characterized in that a state value (Z) is stored at a position (Hi) of the second list, H, as a function of the following steps:

the positions , H0, H1 , . . . , Hk, are searched for a position (Hi) of the second list, H, so that the following is true: value(H0) ≦value(H1) ≦. . . ≦value(Hi) ≦Z ≦value(H (i+1)) ≦. . . ≦value(Hk);

if no such position (Hi) is found, then the state value (Z) is rejected;

if such a position (Hi) is found, then for all positions {(Hj|0 ≦j≦i}the value(Hj) stored at the position Hj is replaced by the value(H(j+1)) stored at the position H(j+1) and the state value (Z) is stored at the position (Hi) of the list, H.

8. A method as claimed in claim 1, characterized in that the following steps are carried out:

as a function of an error tolerance (k), a set (B) of predefinable end values ({B0, B1, . . . , B(k−1)}) is predefined such that B0=0; Bi ≦B(i+1),for all i∈{0, 1, . . . , (k−1)}; and 2j<B(j), for all j∈{1, . . . , (k)}; if Bk ≧n, a value i for i∈{0, 1, . . . , (k−1)}is selected as a function of the number n of acquired state values such that the condition Bi ≦n <B(i+1) is true; if Bk ≦n i=k is selected; and the mean value, M, is formed from the values value(L(k−j)) and value(H(k−j)) stored at the positions L(k−i) and H(k−i).

9. A method as claimed in claim 1, characterized in that the following values are predefined:

error tolerance k=2;
end value B1=3; and
end value B2=8.

10. A node which communicates with other nodes by means of a communication medium, characterized in that the node
has a clock;
has means for acquiring state values, the state values being dependent on a time base of the node and/or on a time base of the other nodes;
has a first list, L, comprising (k+1) positions and a second list, H, comprising (k+1) positions;
has means for filing an acquired state value at a corresponding position of the first list, L;
has means for filing an acquired state value at a corresponding position of the second list, H;
has means for forming a mean value, M, from an element of the first list, L, and an element of the second list, H;
has means for forming a correction value, K; and
has means for correcting the clock.

11. A node which communicates with other s nodes by means of a communication medium, characterized in that the node
has a clock;
has means for acquiring state values, the state values being dependent on a time base of the node and/or on a time base of the other nodes;
has a first list, L, comprising (k+1) positions and a second list, H, comprising (k+1) positions; has means for filing an acquired state value at a corresponding position of the first list, L;
has means for filing an acquired state value at a corresponding position of the second list, H; has means for forming a mean value, M, from an element of the first list, L, and an element of the second list, H;
has means for forming a correction value, K; and
has means for correcting the clock, characterized in that a method as claimed in claim 1 is carried out in the node.

12. A communication system (1) which has a number of nodes that communicate via a communication medium (5), characterized in that at least one node
has a clock;
has means for acquiring state values;
has a first list, L, comprising (k+1) positions and a second list, H, comprising (k+1) positions;
has means for filing an acquired state value at a corresponding position of the first list, L;
has means for filing an acquired state value at a corresponding position of the second list, H;
has means for forming a mean value, M, from an element of the first list, L, and an element of the second list, H;
has means for forming a correction value, K; and
has means for correcting the clock.

13. A communication system (1) which has a number of nodes that communicate via a communication medium (5), characterized in that at least one node
has a clock;
has means for acquiring state values;
has a first list, L, comprising (k+1) positions and a second list, H, comprising (k+1) positions;
has means for filing an acquired state value at a corresponding position of the first list, L;
has means for filing an acquired state value at a corresponding position of the second list, H;
has means for forming a mean value, M, from an element of the first list, L, and an element of the second list, H; has means for forming a correction value K; and
has means for correcting the clock, characterized in that a method as claimed in claim 1 is carried out in at least one node.

14. A computer program which can be run on a computer, in particular on a microprocessor, characterized in that the computer program is stored in a memory element and programmed to carry out a method as claimed in claim 1 when it is run on the computer.

15. A computer program as claimed in claim 14, wherein the memory element comprises a Random Access Memory (RAM), a Read Only Memory (ROM) or a Flash memory.

* * * * *